Patented Feb. 23, 1954

2,670,368

UNITED STATES PATENT OFFICE 2,670,368

PRODUCTION OF ALKYL PHOSPHITES

Arthur A. Baker and James Howard Brown, Niagara Falls, N. Y., assignors to Oldbury Electro-Chemical Company, Niagara Falls, N. Y., a corporation of New York No Drawing. Application September 1, 1950, Serial No. 182,889

5 Claims. (Cl. 260—461)

1

The present invention relates to the production of alkyl phosphites and more particularly to a process for the production of dialkyl phosphites by the direct esterification of orthophosphorous acid with a monohydric aliphatic alcohol.

Alkyl phosphites have heretofore been prepared by the reaction of alcohols and alkali-metal alkoxides with phosphorus trichloride ($PCl_3$) and with phosphorus trioxide ($P_2O_3$). As disclosed by J. W. Mellor in "A Comprehensive Treatise on Inorganic and Theoretical Chemistry," Longmans, Green and Co., New York, vol. VIII, page 904, the reactions of trivalent phosphorus derivatives are more complex and more difficult to control than those involving the corresponding pentavalent phosphorus derivatives. When phosphorus trioxide is reacted with an alcohol, esterification is not the sole reaction; dependent upon the reaction conditions, dehydration reactions resulting in the formation of ethers and olefins, and reactions of the latter to form more complex esters, occur to a greater or lesser extent. Furthermore, phosphorus trioxide can hydrate to phosphorous acids other than orthophosphorous acid ($H_3PO_3$), including hypophosphorous acid ($H_3PO_2$), and pyrophosphorous acid ($H_4P_2O_5$), which lead to esters other than those of the desired phosphorous acid. The result is generally a complex mixture of compounds which is not readily resolvable by simple conventional means. When phosphorus trichloride is used for such esterifications, the reaction is further complicated by the hydrogen chloride involved in the reaction.

When substantially pure phosphorous acid is directly esterified with n-butyl alcohol and similar monohydric alcohols, the production of ethers and possibly olefins proceeds at a rapid rate. By conducting such a direct esterification in accordance with the process of our invention, the formation of ethers and olefins by dehydration is minimized and the desired esterification is promoted. The course of the respective reactions can be estimated by determination of the acid number of the reaction mixture, esterification producing a decrease in the acidity whereas simple dehydration proceeds without any change in acidity of the reaction mixture. The rapid decrease of the acid number of such mixtures when reacted in accordance with our process is noteworthy.

It is the principal object of our invention to provide a process for the production of alkyl phosphites which is readily controllable to produce optimum proportions of the desired ester. A further object of the invention is to provide

2 such a process in which the esterification reaction is promoted and dehydration reactions are suppressed or minimized. Other objects and advantages of the invention, some of which are referred to specifically hereinafter, will be apparent to those skilled in the art to which the invention pertains.

We have discovered that alkyl phosphites, particularly dialkyl phosphites, may be produced in good yield without the formation of excessive quantities of ethers, olefins and other undesirable products, by the direct esterification of the alcohol with phosphorous acid under such conditions that the water present and that formed during the esterification is removed continuously. We have discovered also that this continuous removal of water can be effected advantageously, and the esterification reaction itself be more carefully controlled, by maintaining in the reaction mixture toluene or other inert liquid which forms a ternary azeotropic mixture with water and the alcohol, and which is capable of removing the water as the azeotrope by distillation. The distilled toluene and the alcohol can be recycled, after separation of the water therefrom.

The esterification of phosphorous acid with monohydric alcohols, in accordance with the process of our invention, produces, as the principal product, when an excess of alcohol is used, a dialkyl phosphite. Some monoalkyl phosphites may also be formed, although the reaction to obtain these as the principal product is not as easily controlled. The process is not readily adaptable to the production of trialkyl phosphites.

Phosphorous acid can apparently exist in two forms, as evidenced by the trialkyl esters resulting from different reactions, and these two forms are those corresponding to esters of symmetrical phosphorous acid $HO-P(OH)_2$ and unsymmetrical phosphorous acid $O=PH(OH)_2$, in the first of which the phosphorus atom is trivalent and in the second, pentavalent. The process of our invention is not readily adapted to the production of dimethyl and diethyl esters, since the production of ethers is the predominant reaction when lower alcohols are used. The dialkyl phosphites whose preparation has been effected by the process of this invention are predominantly esters of unsymmetrical orthophosphorous acid. The process of our invention has made it possible also to obtain products which contain a predominant amount of esters of phosphorous acid and higher alcohols, many of which are not susceptible to purification by normal vacuum distillation and accordingly have not heretofore been obtainable in a form of such high purity.

The process of our invention for the production of dialkyl phosphites consists essentially in heating under reflux a mixture of phosphorous acid, an excess of a monohydric alcohol over that required stoichiometrically to form the dialkyl ester, and a substantial proportion of an inert diluent, such as toluene, which is substantially insoluble in water and forms a ternary azeotropic mixture with water and the alcohol. The mixture is heated so that a slow continuous vapor stream of the ternary azeotrope is carried outside the main reaction mixture; this vapor stream is condensed and allowed to settle in a water separator, in which the condensed water containing some dissolved alcohol stratifies in a lower layer and the toluene and alcohol solution stratifies in another layer. The water layer is discarded and the toluene and alcohol solution, which can be dried, if desired, by passing it through a bed of solid dehydrating agent such as calcium oxide, silica gel or the like, or by refrigeration, is returned to the main reaction mixture. The progress of the reaction can be observed by noting the change of the acid number of the reaction mixture, which should gradually decrease, if the reaction proceeds to form esters instead of ethers or olefins. The product is then recovered in conventional manner, preferably by fractional distillation at subatmospheric pressure, but, in the case of esters of the higher alcohols, which are less stable at higher temperatures and decompose on distillation, other methods, such as crystallization, may be used when further purification is desired.

In laboratory preparations, the separation of the water from the distillate and the return of the solvent-alcohol layer to the reaction mixture may be made in a continuous manner by using a phase separator such as is described on page 249 of "Principles and Practice in Organic Chemistry" by Howard J. Lucas and David Pressman, published by John Wiley and Sons, New York, 1949, or an automatic separator provided with a drying chamber for the removal of dissolved water in the organic solvent-alcohol layer, as described on page 261 of "Organic Syntheses," collective volume I, second edition, edited by A. H. Blatt, and published by John Wiley and Sons, New York, 1941. For large-scale production conventional equipment for recovering and recycling the alcohol and solvent, and for removing the water therefrom, can be used. The process of our invention is essentially a recycling batch process but it may be modified in such manner as to be made continuous by charging into a reaction mixture separate streams of the phosphorous acid and alcohols or a mixture of the two and withdrawing therefrom an amount of the reaction mixture to compensate for the reactants added and subjecting the same to purification.

The phosphorous acid which is used in our process is preferably a product which has been obtained by concentration of a more dilute acid, for example, commercial 70 per cent acid that has been concentrated to a product containing 90 per cent or more $H_3PO_3$. Any water remaining in acids having this concentration will be removed as an azeotrope with the alcohol and the inert solvent in the preliminary stages of the process. Although acids of the specified concentration can be prepared by direct hydration of phosphorus trioxide ($P_2O_3$) with the stoichiometric amount of water, phosphorus trioxide is not available commercially and such method of preparation would offer no substantial advantage over concentration of a dilute 70 per cent phosphorous acid.

The monohydric aliphatic alcohols which may be used in the process include generally those containing at least three carbon atoms, including n-propanol, isopropanol, the four butanols, pentanols, hexanols, octanols and other higher alcohols, including octadecanols and eicosanols.

The inert solvents which are used to remove water continuously by distillation from the reaction mixture include benzene, toluene, xylenes, carbon tetrachloride, trichloroethylene, perchloroethylene, anisole, di-n-butyl ether and higher ethers. Esters, and aldehydes and ketones, are not suitable because of their lack of inertness in the reaction mixture. In general, the preferred solvents are those which are inert in the reaction and form ternary azeotropic mixtures with water and alcohols, whose solubilities in water are not great but which are soluble in substantial amounts in the alcohol, although solubility of the solvent in alcohol or its ability to form a ternary azeotrope with the alcohol and water instead of a more binary azeotropic mixture with the water are not essential characteristics of the solvent. In general, the solvent should be chosen with respect to its inertness, the composition of its azeotropic mixture with water and the particular alcohol (that azeotrope containing the greatest percentage of water being preferred, if it is in other respects as good) and its solubility in water. Even a water-soluble solvent may be used if provisions other than those for mere separation of an aqueous layer are taken to remove the water before return of the distilled alcohol and solvent to the reaction mixture.

The following examples are intended to be illustrative rather than limitative of the process of our invention.

*Example 1.—Di-n-butyl phosphite*

Commercial phosphorous acid (70 per cent $H_3PO_3$) was concentrated by evaporation to a product having a 97 per cent content of orthophosphorous acid and was then allowed to solidify. To 422 grams (approximately 5 moles) of this 97 per cent orthophosphorous acid were added 925 grams (approximately 12.5 moles) of commercial normal butanol and 481 grams of commercial toluene. The acid number of a uniform sample of the mixture, determined by titration, was found to be 306. The mixture was heated to boiling, whereupon it became homogeneous, and it was heated gently under reflux in an apparatus provided with a condenser, moisture trap and a return line to the flask. In this trap the condensed vapors were collected, the two liquid layers that formed were separated periodically, the toluene-alcohol layer being returned to the reaction flask through the return line, and the water layer being allowed to accumulate in the trap or discarded immediately upon each separation. In this manner, any water initially present in the reaction mixture together with that formed during the reaction, was continuously removed from the zone of reaction.

After thirty-four hours of heating, the amount of water collected amounted to 176 grams (approximately 9.8 moles). The acid number of the mixture was then 62, which is 20 per cent of the initial acid number. Although esterification, ether and olefin production all produce water, reduction in acid value results only from esterification.

The reaction product was subjected to distillation at subatmospheric pressure, with the following result:

| Fraction | Temperature Range, °C. | | Pressure, mm. Hg | Weight, grams |
|---|---|---|---|---|
| | Vapor | Liquid | | |
| 1 | 31-42 | 41-131 | 38-21 | 653 |
| 2 | 56-101 | 118-126 | 7-5 | 69 |
| 3 | 101-103.5 | 132-148 | 6-5 | 619 |
| 4 | 103-111 | 158-165 | 9-8 | 35 |

The residue was a yellow, viscous, acidic liquid, and was identified as consisting principally of monobutyl phosphite.

Fraction 1 consisted principally of toluene and the excess n-butanol.

Fraction 2 consisted principally of di-n-butyl phosphite together with some di-n-butyl ether and other impurities.

Fractions 3 and 4 are substantially pure di-n-butyl phosphite. The yield of the two fractions (654 grams) is slightly more than 65 per cent of the theoretical based upon the phosphorous acid used.

*Example 2.—Di-2-ethylhexyl phosphite*

To 169 grams (approximately 2 moles) of 97 per cent phosphorous acid prepared as described in Example 1 were added 780 grams (approximately 6 moles) of commercial 2-ethylhexanol and 500 grams of toluene. This mixture was heated under gentle reflux in an apparatus similar to that described in Example 1 for a period of 16 hours, removing water as formed as described in Example 1. Approximately 76 grams (4.2 moles) of water were separated and removed and the acid number of the mixture decreased to 4.4 per cent of its initial value, indicating esterification of more than 90 per cent of the acid used.

A portion of the crude reaction product (1344 grams) was distilled at reduced pressure, with the following results:

| Fraction | Temperature Range, °C. | | Pressure, mm. Hg | Weight, grams |
|---|---|---|---|---|
| | Vapor | Liquid | | |
| 1 | 34-40 | 47-108 | 47-39 | 461 |
| 2 | 33-173 | 75-188 | 21-7 | 359 |
| 3 | 171-178 | 187-197 | 11-7 | 342 |

Slight decomposition occurred at the end of the distillation. The residue was a pale yellow-colored, viscous liquid and weighed 144 grams.

Fraction 1 consisted principally of toluene.

Fraction 2 consisted principally of 2-ethylhexanol and unidentified products.

Fraction 3 is substantially pure di-2-ethylhexyl phosphite, which on redistillation boiled at 174° C. at a pressure of 7 mm. of mercury, and its total yield corresponds to 56 per cent of the phosphorous acid used.

Fraction 4 is largely mono-2-ethylhexyl phosphite.

*Example 3.—Didodecyl phosphite*

A mixture of 84.3 grams (approximately 1.0 mole) of 97 per cent phosphorous acid prepared as described in Example 1, 559 grams (approximately 3.0 moles) of commercial lauryl alcohol and 280 grams of toluene were heated under gentle reflux for 11 hours and the water was distilled out continuously as described in Example 1. The water collected weighed 39 grams, slightly more than that stoichiometrically possible (36 grams) in accordance with the following reaction:

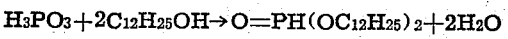

During the reaction, the acid number of the mixture decreased to 6 per cent of its original value.

The toluene and the predominant portion of the excess lauryl alcohol were removed by vacuum distillation but it was impossible to distill the didodecyl phosphite without decomposition at a pressure higher than approximately 10 mm. of mercury and a temperature of 270 degrees centigrade. The weight of the impure didodecyl phosphite thus obtained was 482 grams.

*Example 4.—Dioctadecyl phosphite*

A mixture of 84.3 grams (approximately 1.0 mole) of 97 per cent phosphorous acid prepared as described in Example 1, 793 grams (approximately 2.94 moles) of octadecyl alcohol and 450 grams of toluene was heated under gentle reflux for 10 hours and the water was distilled out continuously as described in Example 1. The water collected weighed 35 grams, which was slightly less than the stoichiometric amount, and the acid number decreased to 9.5 per cent of the initial value, indicating that the acid had been largely esterified.

The volatile components of the reaction mixture were removed by vacuum distillation in the same manner as described in Example 3 and the impure dioctadecyl phosphite thus obtained weighed 830 grams.

Inasmuch as the foregoing description comprises preferred embodiments of the invention, it is to be understood that the invention is not limited thereto and that conventional modifications, substitutions and alterations of the processes described will occur to those skilled in the art to adopt them to the production of similar products. The invention is accordingly to be limited solely by the scope of the appended claims.

We claim:

1. A process for the production of a diester of phosphorous acid and a monohydric alcohol which comprises the direct esterification of the alcohol containing at least three carbon atoms in the molecule and phosphorous acid by heating them together in the presence of a substantial quantity of an inert organic solvent which forms a ternary azeotropic mixture with the alcohol and water while removing the water of esterification from the reaction mixture continuously as formed, and subsequently recovering the ester from the reaction mixture.

2. A process for the production of a diester of phosphorous acid and a monohydric aliphatic alcohol containing at least three carbon atoms in the molecule which comprises heating together phosphorous acid with an amount of alcohol in excess of that required stoichiometrically to convert all the phosphorous acid to the desired ester and a substantial amount of an inert organic liquid which forms a ternary azeotropic mixture with the alcohol and water, distilling the water from the reaction mixture continuously as formed in the esterification reaction by distillation as the said ternary azeotrope, and subsequently recovering the ester from the reaction mixture.

3. A recycling batch process for the production of a dialkyl phosphite by esterification which comprises heating together phosphorous acid and a monohydric aliphatic alcohol containing at least three carbon atoms in the molecule and an inert solvent which forms a distillable azeotropic mixture with water, continuously distilling from the reaction mixture the water in the form of an azeotropic mixture with the inert solvent, removing the major portion of the water from the distillate, and recycling the distillate thus freed from water to the reaction mixture, and subsequently recovering the dialkyl phosphite from the reaction mixture.

4. A process for the production of di-n-butyl phosphite which comprises heating together phosphorous acid with at least two molecular proportions of n-butyl alcohol and a substantial amount of toluene, removing the water from the reaction by distillation as the ternary water-n-butyl alcohol-toluene azeotrope, condensing the said distillate, removing the water therefrom, returning the resulting toluene-n-butyl alcohol solution to the reaction mixture, and subsequently recovering the di-n-butyl phosphite from the reaction mixture.

5. A process for the production of di-2-ethylhexyl phosphite which comprises heating together phosphorous acid and at least two molecular proportions of 2-ethylhexanol and a substantial amount of toluene, removing the water from the reaction mixture continuously as formed in the esterification by distillation as the ternary water-2-ethylhexanol-toluene azeotrope, condensing the said distillate, removing the water therefrom, returning the resulting toluene-2-ethylhexanol solution to the reaction mixture, and subsequently recovering the di-2-ethylhexyl phosphite from the reaction mixture.

ARTHUR A. BAKER.
JAMES HOWARD BROWN.

References Cited in the file of this patent

Saks & Levitskii, J. Russ. Phys. Chem. Soc., vol. 35, pp. 211–218 (1903).

Arbusov, J. Russ. Phys. Chem. Soc., vol. 46, pages 291–294 (1914).

Morton, Lab. Technique in Org. Chem. (1938), pages 64–66.

Thomas, J. Chem. Soc. (1946), pages 820–824.

Kosolapoff, Organo-Phosphorus Compounds, pages 202–203 (1950). John Wiley and Sons, New York. Citing Arbusov, Izvestiya Akad. Nauk S. S. S. R., o. kh. n., 1947, page 617; Doklady Akad. Nauk. S. S. S. R., vol. 55, page 31 (1947).